United States Patent [19]
Knight et al.

[11] 4,076,233
[45] Feb. 28, 1978

[54] DOCUMENT HANDLING APPARATUS

[75] Inventors: Clifford Knight, Mitcheldean; Peter M. Thorp, Lydbrook, both of England

[73] Assignee: Xerox Corporation, Stamford, Conn.

[21] Appl. No.: 687,062

[22] Filed: May 17, 1976

[30] Foreign Application Priority Data

Oct. 24, 1975 United Kingdom ............... 43930/75

[51] Int. Cl.² .......................... B65H 9/04; B65H 5/02
[52] U.S. Cl. .................................... 271/233; 271/275; 271/DIG. 9
[58] Field of Search ....................... 271/233, 246, 3, 4, 271/6, 7, 10, 272, 273, 245, 275, 34, DIG. 9, 242, 243, 264, 198, 12; 355/76; 198/725, 726

[56] References Cited
U.S. PATENT DOCUMENTS

| 2,370,325 | 2/1945 | Ranney | 198/726 X |
| 3,311,369 | 3/1967 | Pitt | 271/198 X |
| 3,510,125 | 5/1970 | Krueger et al. | 271/233 X |
| 3,567,214 | 3/1971 | Crandell et al. | 271/10 |
| 3,747,918 | 7/1973 | Margulis et al. | 271/275 X |
| 3,844,552 | 10/1974 | Bleau et al. | 271/246 X |
| 3,975,013 | 8/1976 | Deisting | 271/272 X |

Primary Examiner—Bruce H. Stoner, Jr.

[57] ABSTRACT

An automatic document handler employing an belt endless for moving the document to be scanned onto a stationary scanning platen, the belt having a width substantially less then the width of the documents to be handled thereby. The document engaging run of the belt is trained over a support located at a point generally intermediate two belt supporting rollers so that the belt contacts the platen in two separated areas on opposite sides of the intermediate point.

3 Claims, 4 Drawing Figures

DOCUMENT HANDLING APPARATUS

BACKGROUND OF THE INVENTION

This invention relates to a document handling apparatus and specifically concerns a means and method for automatically moving documents into and out of a position at which they may be copied.

Document handlers separate an individual document from a stack of documents to be copied and move it to an exposure platen where it is registered, held until the required number of copies have been made, and then moved onto an output collection point to be followed by successive documents in the stack. For this purpose the document handling apparatus should provide a convenient and reliable means of maximizing the copy capacity of the machine as well as increasing the quality of registration and copy control over what would be possible with manual operation.

In a generally way, sheet feeding devices for transporting an individual document from a stack of documents to an exposure station are known in the art as shown for example in U.S. Pat. Nos. 3,506,257, 3,674,363, 3,863,912, 3,893,662 and U. K, Pat. No. 1,381,684. The known devices, however, suffer shortcomings in that they do not generally possess the high degree of document control and/or registration capability equal to the high speeds at which machines now operate. Thus, the automatic handler must not only rapidly move the document but must accurately register the document in a specific predetermined copying position or area to assure the production of a complete and visually acceptable copy. For example, if the document is situated on the platen in a skewed or misaligned position within the area, the copy will reflect this same skew or misalignment and may be incomplete and/or unacceptable to the user. If the original is torn or creased it may not be acceptable to the user for a great number of reasons, not the least of which may be unsuitability for subsequent use in a machine or automated processor. The automated document handler must also be able to accept a maximum range of paper or material weights efficiently as documents copied may vary from light weights such as what is known as "onion skin" to very much heavier weights. Another important criteria for an automated document handler is the ability to readily accommodate manual document handling as is necessary when bulky items such as books must be copied. This means the working area or exposure platen must be able to be quickly cleared and be easily accessible to an operator who may have only one page of a book to copy between runs comprising stacks of documents. All of these functions must be performed with a maximum of reliability under wide variations of heat and humidity by a device manufacturable at minimum cost.

While the prior art has in some ways addressed itself to the above points it will be apparent that the solutions have been unduly complex and/or incomplete. For example, several allow compensation for initial manufacturing tolerances and misalignment but do not overcome any inconsistent skew which may occur. Others rely upon readily changeable variables such as timing accuracy and the repeatability of motor braking and lack of slip so that while they may be tuned to provide good results, the effect is temporary.

It was recognized that if a document could be registered against a stop, the number of variables could be reduced; however, it was found that the wide belts used required critical settings of belt tensions and/or allowed only small skew compensations which were unacceptable for some purposes.

SUMMARY OF THE INVENTION

In accordance with the present invention there is provided a document handling apparatus for a copying machine, comprising a document transport means including an endless document-moving belt means extending between first and second roller means and movable over a relatively wide surface of a document processing station, the rollers being located on opposite sides of the surface, the belt means being relatively narrow compared with the surface and being generally centrally located over the surface whereby in operation, the belt means engages a generally central portion of a document to move the document over the surface.

More specifically there is provided a document handling apparatus for a copying machine comprising a document processing station having a surface bounded in part by opposite first and second sides, the handling apparatus including a registration means adjacent the first side of the surface, a document feed means adjacent the registration means for feeding documents one at a time past the registration means onto the surface, and document transport means comprising a narrow belt means centrally positioned over the surface adapted to contact a central portion of said documents for controlling their movement, the transport means being adapted to move the documents in a first direction onto the surface, reverse the movement to move them in a second direction to register the documents in cooperation with the registration means and, after exposure, move the documents again in the first direction to remove them from the surface past the second side.

According to another aspect of the invention there is provided a method for handling documents for exposure thereof on a copying machine exposure surface including the steps of frictionally engaging a first document on a generally central portion of a side away from the exposure surface in a central area thereof with a narrow document-moving belt means that extends across the surface, moving the belt means in a first direction for a predetermined time to feed the first document in a first direction across a registration means whereby the trailing edge of the document passes the registration means, reversing the direction of the belt means to move the first document in a second direction for a predetermined time whereby the trailing edge of the document engages the registration means to align the document and, after exposure, moving the belt means in the first direction a predetermined time to move the first document off of the exposure surface and move a second document across the registration means.

BRIEF DESCRIPTION OF THE DRAWINGS

The invention will now be described by way of example with reference to the accompanying drawings in which.

DESCRIPTION OF THE PREFERRED EMBODIMENT

Figure 1:
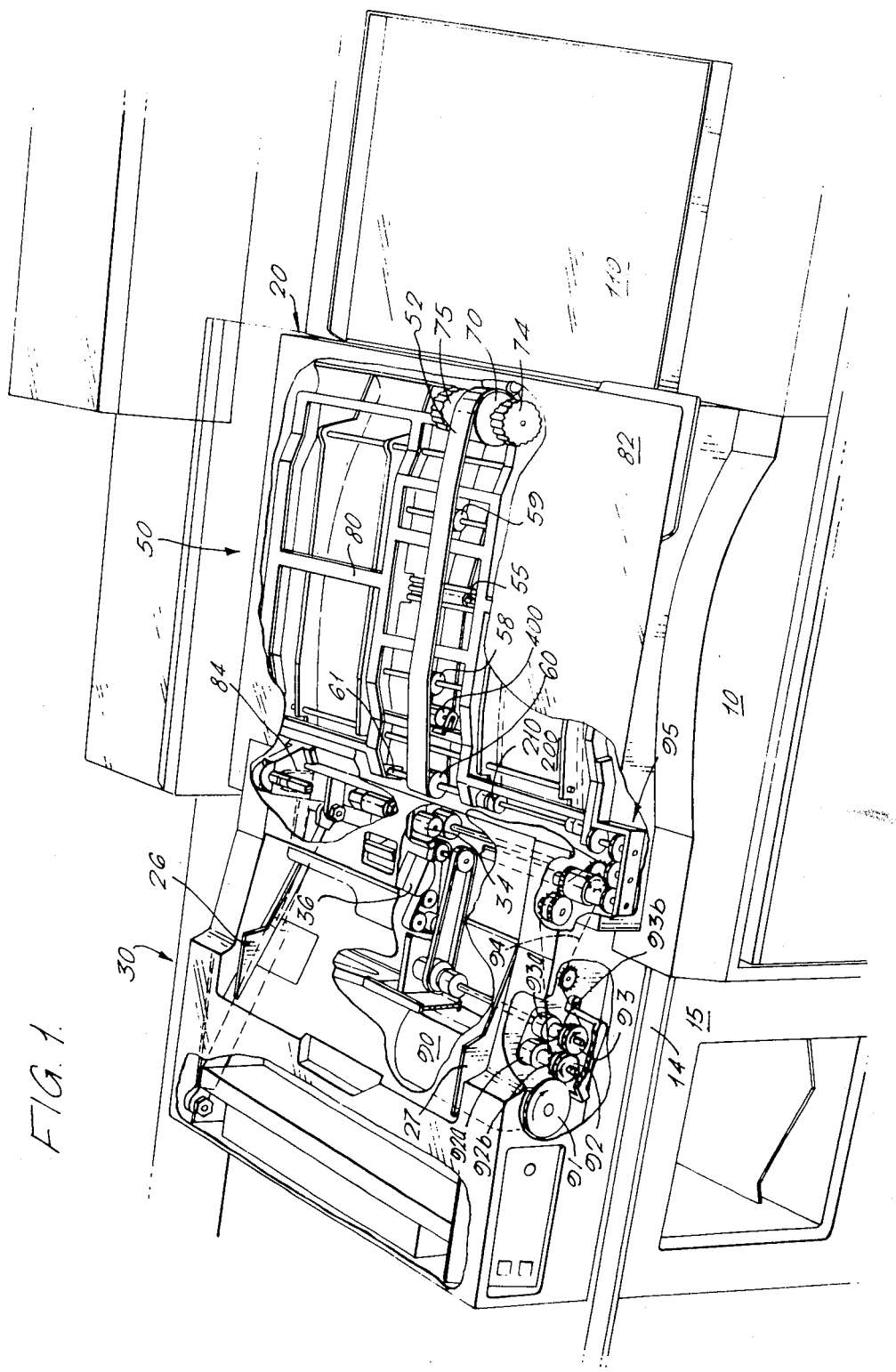
FIG. 1 is a perspective view of a document handling apparatus in place on a copying machine with parts of the apparatus shown in cross-section.

Referring to FIG. 1 of the drawings there is shown a portion of an automatic electrostatic reproduction machine 10 of the type disclosed for example in U.S. Pat. No. 3,301,126 having a document handling apparatus of the invention generally indicated at 20 overlying a work station comprising an exposure area of platen 12 of the machine 10 and extending over an upper surface 14 of a sorter extension 15 of the machine. The document handler 20 is synchronized with the control of the machine 10 to automatically feed documents, (which documents may also be referred to as "originals" to distinguish them from their copies) to the platen 12, register them, hold them in position until the selected number of copies have been produced by the machine 10 as required and then remove them from the platen while feeding the next document to be copied. One method of producing the copies by the machine 10 will be understood for example by reference to the above mentioned Patent No. 3,301,126 from which it will be seen that the platen 12 is illuminated from below by the lamps 13 in FIG. 2 and the image on an upper surface 12a of the platen reflected onto a photoreceptor surface (not shown here) where the image is developed and from which it is transferred to a suitable substrate to produce the copy.

Document handling apparatus 20 generally comprises a sheet material feeder means 30 and a document transport means 50. The feeder means 30 includes a document supply tray 24, a separator means 32 and a pair of advancing or pinch rolls 34 which are adapted to feed any relatively bendable sheet-like material such as paper, film, etc., one sheet at a time from a quantity of documents, which may be of random size and thickness, to a predetermined position where the document transport means 50 may take control.

For specific details of an embodiment of a sheet separator means 32 which has been found to perform particularly well in this environment reference may be made to copending U.S. Patent application Ser. No. 687,060 filed on even date herewith, now abandoned.

In operation, documents 22 which may be of the ordinary business type having generally straight and parallel forward and rear edges 22a, 22b respectively, are placed face down for copying in the inclined tray 24 so that the forward edge 22a of the document will be held normal to the direction of document travel by a suitable restraining means 36.

The alignment of the document feed means 32 relative to the processing station 12, which may be an exposure station, is preferably such that the center line of the documents remains at generally the same position regardless of the width of the document. This alignment is provided by a pair of self-centering side guides 26 and 27 on opposite sides of the supply tray 24 which restrain the side edges of the documents generally parallel to the direction of feeding movement and tend to assure the feeding of documents from a central area of the stack or pile regardless of the width of the stack.

With the document thus in place and the processor 10 set to make the required number of copies of each document 22, automatic operation is initiated by activation of a suitable "start print" control.

From its position on the bottom of the document pile in tray 24, the first document is separated from the remainder of the stack by the separating means 32 and fed forward over a guide 33 so that its forward edge 22a enters into the nip of the driven pinch rolls 34, which rolls pull the document 22 completely from the tray and move its forward edge 22a over a registration edge means 40 and under the control of the transport means 50.

Figure 3:
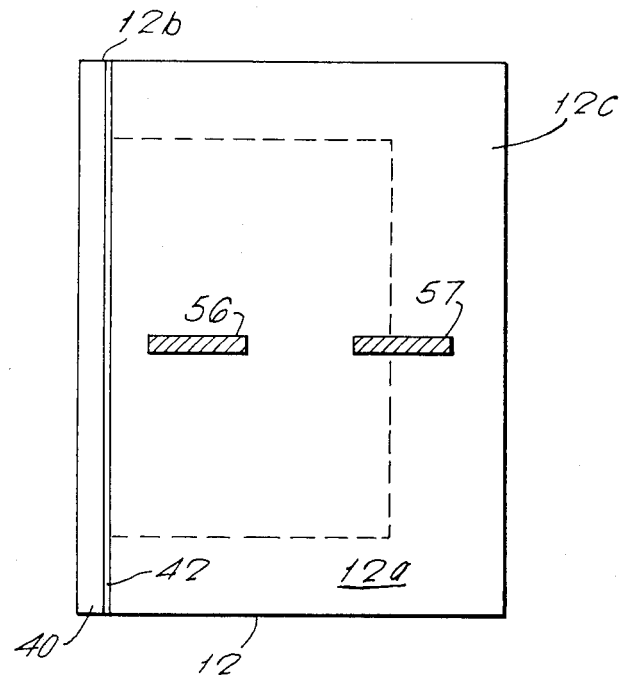
FIG. 3 is a schematic plan view of the copying machine platen showing typical contact areas of a single belt embodiment.

The document transport means 50 preferably comprises an endless belt means 52 riding over and extending between a first roller means 60 and a second roller means 70, whereby the belt means 52 is movable in alternate first and second directions. The roller means 60 and 70 rotate on shafts 61 and 71 respectively which are mounted on a movable frame means 80 located centrally along opposite sides 12b and 12c of the platen upper surface 12a so that the belt entrained thereover extends across the central portion of the platen or processing station 12, as may be best seen in FIG. 3. the frame 80 supports a suitable outer cover 82 which hides the moving parts and prevent light from entering the platen 12.

Preferably the first roller means 60 is of small diameter (e.g, 1.5 inches) so that a nip 62 between the belt means 52 entrained thereover and the platen surface 12a may be as close as necessary to the edge 12b of the platen and to the paper feed means 30. The belt means 52 rests on the platen surface 12a and is made of a material such as silicone rubber on a flexible backing and is preferably white on its outer surface and has a high coefficient of friction with paper type materials, e.g., $1.0 - 1.5\mu$. The platen surface 12a will usually be smooth glass so that its coefficient of friction with the paper or belt is relatively low, e.g., less than $1.0\mu$. Consequently, a document in the form of a material with a high coefficient of friction such as paper for example, will be effectively gripped by the belt 52 on its upper side when it is fed into the nip 62 and caused to slide over the surface 12a on its lower side under the control of the belt means 52.

A registration member 40, functioning to align documents in a predetermined relationship, extends along platen edge 12b and is arranged so that documents being fed toward the platen 12 in a first direction pass smoothly thereover; however, it includes an edge 42 raised above the surface 12a so that once a document passes thereover and is moved in a second, reverse, direction, the trailing edge 22b of the document held against the surface 12a will abut thereagainst. A baffle member 200 may be provided, as set out in copending U.S. Patent application Ser. No. 687,059 filed on even date herewith, now U.S. Pat. No. 4,043,550, to assure proper abutment of the document edge against the registration surface 42. As is known from U.S. Pat. No. 3,301,126 suitable indicia may be provided on the registration member to allow manual alignment of documents when the machine is being used in a manual mode.

Figure 2:
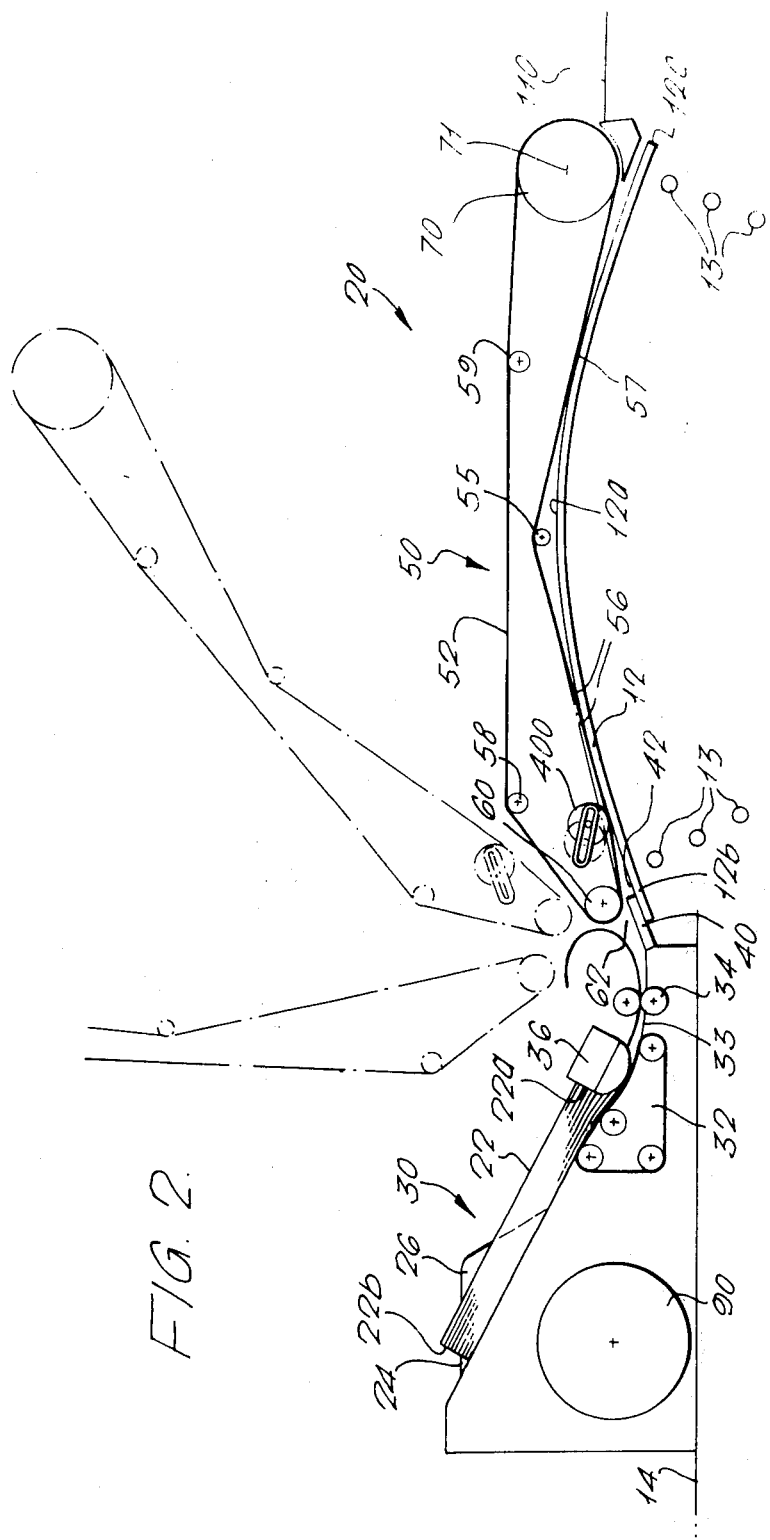
FIG. 2 is a schematic cross-sectional view of the apparatus of FIG. 1.

A schematic illustration of how the transport means 50 moves out of position to allow access to the platen area 12 for manual use or cleaning is set forth by the dotted lines in FIG. 2 where the mechanism is represented in a generally half open and a fully open position. As may be understood from FIG. 1 the frame means 80 pivots about an axis 84 that is especially spaced above the platen 12 to allow a very full opening extending the frame 80 upwardly about ninety degrees.

A support means 55 for the belt means 52 is positioned on the outside of the belt means 52 to form a hitch above the platen 12 at an intermediate point between the first and second roller means 60, 70 respectively so that the belt means contacts the processing station surface 12 at two separated contact areas 56, 57 along its length, one being on each opposite side of said intermediate point, as is shown in FIG. 2. Preferably, the intermediate point is generally halfway between the first and second roller means. In practice we have found that contact areas of two to three inches in length provide sufficient control of the document. The belt support means 55 preferably is a highly durable material having a coefficient of friction such as Delrin (Trademark) for example. It may be of fixed configuration as shown or may take other equivalent forms.

Other idler rollers such as shown in 58, 59 may be provided as required at other positions along the length of the belt means 52. These may be positioned to adjust belt tension.

Figure 4:
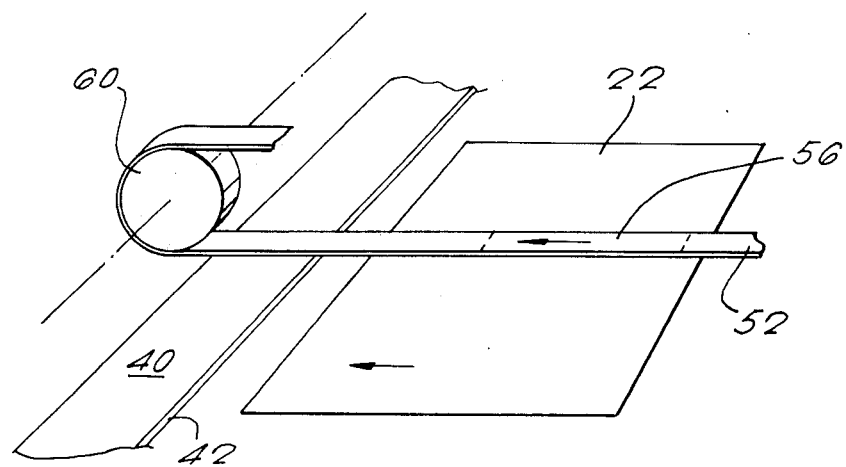
FIG. 4 is a perspective view of an enlarged portion of the invention showing correction of skew against a registration edge.

The separated contact areas have the advantage that the area of frictional engagement between the belt means and the document may be set to assure a good grip of the document by the belt as it is being moved onto the platen 12, but yet allow pivoting of the document in a generally central area as shown in FIG. 4 so that any skew may be corrected when the document is moved by the belt against the registration member 40. With a full width belt, frictional contact between the document and the belt tends to be so great that no amount of skew of the document can be corrected on registration and the document will buckle.

A further advantage of the multiple contact areas is that the functions of document positioning and ejecting are separated. Generally, for the most part the former is controlled by the area 56 and ejection from the platen is controlled by the area 57. The magnitude of the forces on the document may be controlled by varying the coefficient of friction of belt support means 55. Thus, the higher the coefficient of friction of means 55, the greater the tension difference on either side of the support means.

An additional benefit of the intermediate support 55 is to limit the amount of sag in the belt means 52 when the transport means 50 is lifted from its operative position on the platen to an inoperative position above the platen as shown for example by the dotted lines in FIG. 2, and in FIG. 4.

By using a narrow belt means 52 with a crowned roller means 60, 70, construction is greatly simplified in that no side guides are required and tracking problems are greatly reduced from what they are known to be with a wide belt. Thus, we have found that a wide belt, or one with a length to width ratio of less than about 35–1 does not track accurately without guides and/or very expensive precise alignment of the pulley axes and therefore may have a tendency for sideways movements which could cause skewing of the document.

We have found that a narrow belt by contrast, i.e., one of greater than a 35–1 length to width ratio, tracks very well without any guides and does not cause the document to skew.

Operating the belt means 52 in a stable condition on crowned pulleys or rollers 60, 70 without edge guides eliminates the belt edge wear and possible detracking which may occur under unstable conditions. Accordingly, maintenance is minimized. The drive roller means 60, may advantageously be rubber tired to improve traction.

Ejection of documents from the platen 12 is initiated by the belt means 52. However, the final push onto an output tray 110 is assisted by a pair of ejection rollers 74, 75 which are coaxial with the second roller means 70. The pair of ejection rollers avoid skewing the document during ejection to provide a neat readily collectable output.

Power to drive the paper feeder means 30 and the belt transport means 50 is supplied by a motor 90 which may be advantageously located under the document tray 24. Rotary motion is transmitted from the motor drive gear 91 to a pair of counter rotating gears 92, 93 which is turn are each connected via clutch means 92a, 93a to chain drive sprockets 92b, 93b respectively whereby alternate engagement of the clutches will transmit counter clockwise or clockwise rotation respectively to a chain drive means 94. A clutch surface between the gears 92, 93 and sprockets 92, 93b is engaged or disengaged by a clutching means which is electrically energized in response to machine control logic. The chain drive means 94 in turn causes the pinch rolls to drive intermittently and a series of interconnected gears generally indicated at 95 to alternately drive axis 61 and the first roller means 60 in opposite first and second directions and turn the platen baffle lift means 210 as required.

In operation, as the sheet feeder 30 begins to separate and feed document 22, the platen baffle means 200 is raised by the clutch means 210 to open a document entrance gap between it and the registration member 40 so that documents advanced by the pinch rolls 34 will enter the gap. When the pinch rolls 34 pass the forward or leading edge 22a of a document toward the nip 62 of the document transport means 50 a sensing switch located between them is tripped which causes a trailing edge 22b of the document to be detected. The document then passes over registration means 40 and the belt means 52 moves the document in a first direction for a predetermined time. At about the time the baffle 200 is caused to close against member 40, the belt means 52 reverses to move the document in a second direction for a predetermined length of time until the trailing edge would be expected to abut the registration edge 42. The reverse movement of the belt means is timed to allow the trailing edge to abut the registration surface 42 and cause the belt means 52 to slip over it briefly to assure full registration alignment and correction of any skew. During the registration step, generally the portion 56 engages the document and during ejection both portions 56 and 57 contribute. As is set out in greater detail in our copending U. S. Patent application Ser. No. 687,061 filed on even date herewith the belt means 52 may be arranged to exert a lesser frictional force on the document 22 when moving in the second registering direction than it did when moving the document in the first direction. The reduced pressure allows slippage of the belt means 52 when registering the document against the surface 42 so that the document may more easily move about to correct skew.

Closure of baffle 200 against the registration member 40 prevents movement of the trailing edge 22b over the registration edge 42 and minimizes the opportunity of the document 22 to buckle. In practice paper weights in a limited range of 47 to 120 grams per square meter have been very successfully handled, giving rise to the belief that a much greater range may be accommodated.

Accurate registration of the document 22 on the exposure surface 12 is essential in that the relationship between a document to be copied, the mechanism by which it is to be copied and the material onto which it is to be copied are very precisely predetermined so that if registration is off, the copy will not, in most cases of 1:1 copying onto document sized paper, include all of the original document. Even where document margins are such that essential information would not be lost as a result of misregistration, nevertheless the aesthetics and integrity of copy would be severely reduced in the eyes of a reader. In most cases, it just would not look acceptable and hence the information it conveys may suffer as a result. Accordingly, this is not acceptable.

After the document has been registered, the predetermined number of copies are made and the logic control activates the document handler 20 to eject the copied document and forward the next document for registration and copying in similar fashion. This continues until a sensing switch (not shown) in the tray 24 detects the absence of documents and automatically stops the apparatus.

Although the invention has been described in terms of a single narrow centrally located belt means 52 it is within the scope of this invention that the centrally located belt means may comprise two or more parallel narrow belts.

While the preferred embodiment described has included a curved platen it will be understood that the invention herein is not so limited but applies as well to flat platen and other processing station configurations. Moreover, it will be understood that the terms "platen" and "exposure area" are intended to include any work station where a sheet of material is to be positioned so far as practical in a predetermined place. Thus, generally it matters not for what reason the sheet material is so positioned or the specific act performed upon it. For example, the "exposure" may include electronic scanning or magnetic read off.

While we have described and illustrated herein a preferred form of the invention, it will be apparent to those skilled in the art that changes and modifications may be made thereto without departing from the spirit and intent of the invention which is limited only to the scope of the appended claims.

What is claimed is:

1. A document handling apparatus for a copying machine, comprising a document transport means including a single, narrow width, endless document-moving belt extending between first and second roller means and movable over a relatively wide surface of a document processing station, said roller means being located on opposite sides of said surface to centrally locate said belt over said surface, whereby in operation said belt engages a generally central portion of a document to move said document over said surface, and support means for supporting said belt at an intermediate point between said first and second roller means, said intermediate point being generally halfway between said first and second rollers so that said belt contacts said surface in two separated areas on opposite sides of said intermediate point.

2. A document handling apparatus according to claim 1 wherein said two areas are generally at the quarter points between said first and second roller means.

3. A document handling apparatus for a copying machine comprising a document processing station having a surface bounded in part by opposite first and second sides, said handling apparatus including a registration means adjacent said first side of said surface, a document feed means adjacent said registration means for feeding documents one at a time past said registration means onto said surface, and document transport means comprising a narrow belt means centrally positioned over said surface and adapted to contact a central portion of said documents for controlling their movement, said transport means being adapted to move said documents in a first direction onto said surface, reverse the movement to move them in a second direction to register said documents in cooperation with said registration means and, after exposure, move the documents again in said first direction to remove them from said surface past said second side; and, a support for entraining said belt means thereover at a point in the portion of its length which is over said surface of said document processing station, said support having a coefficient of friction such that the portions of said belt means on opposite sides of said support are under different tensions.

* * * * *